H. C. JARVIS.
LOGGING CAR AND BUNK.
APPLICATION FILED NOV. 27, 1916.
1,215,159.
Patented Feb. 6, 1917.
2 SHEETS—SHEET 1.
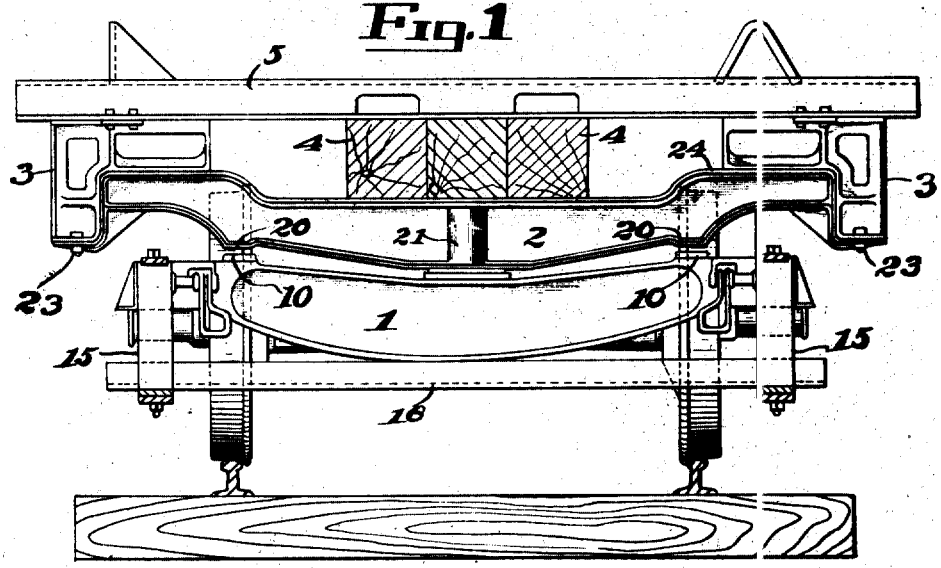
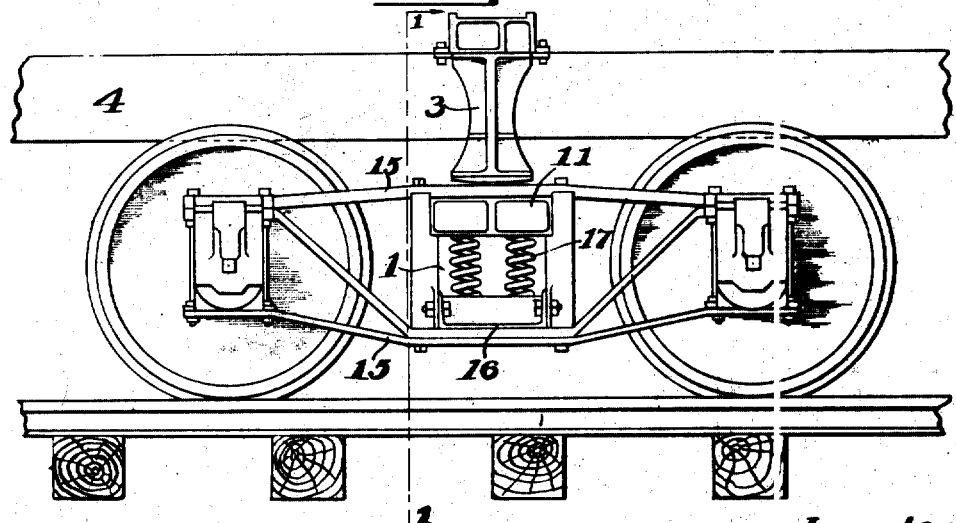
Inventor
Herbert C Jarvis
By Henry L. Reynolds
Attorney H. C. JARVIS.
LOGGING CAR AND BUNK.
APPLICATION FILED NOV. 27, 1916.
1,215,159.
Patented Feb. 6, 1917.
2 SHEETS—SHEET 2.
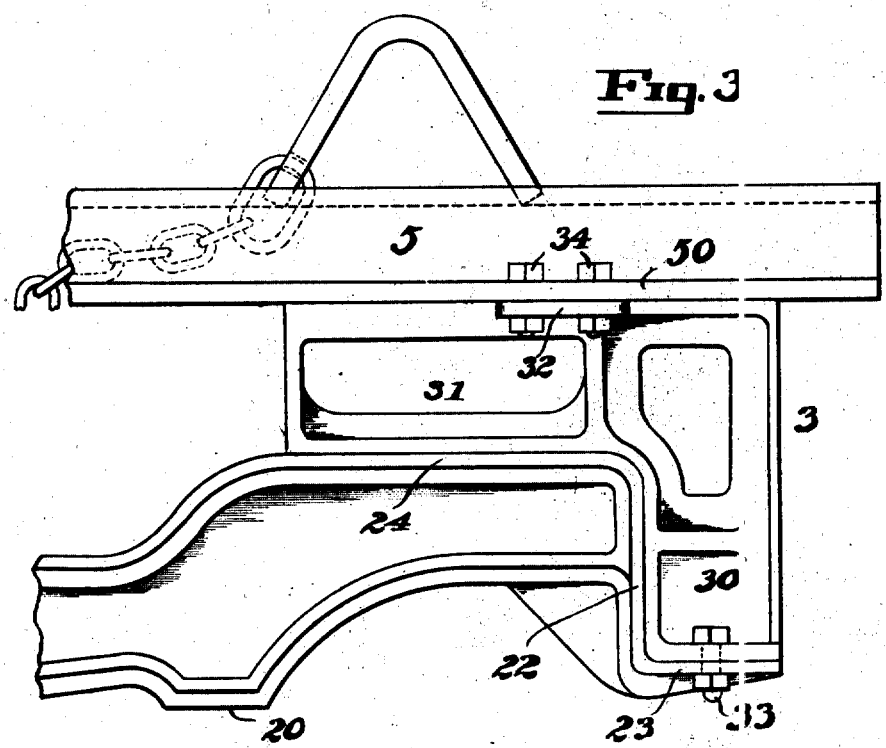
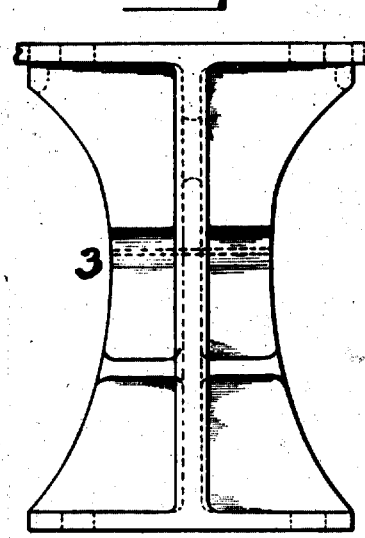
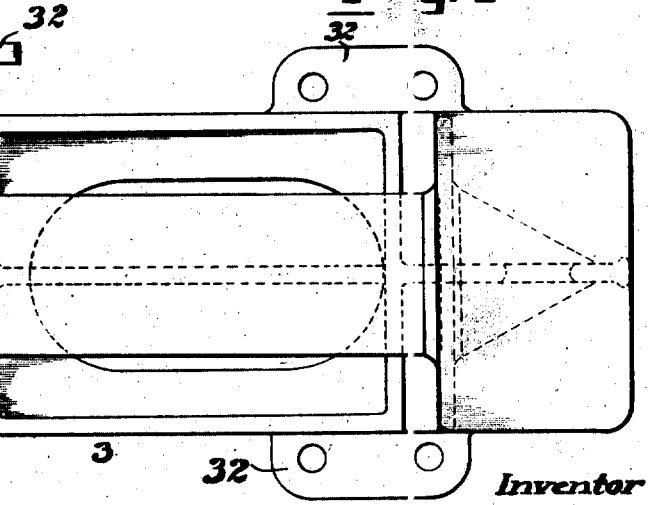
Inventor
Herbert C. Jarvis
By Henry L. Reynolds
Attorney

UNITED STATES PATENT OFFICE.

HERBERT C. JARVIS, OF RENTON, WASHINGTON, ASSIGNOR TO SEATTLE CAR & FOUNDRY CO., OF SEATTLE, WASHINGTON, A CORPORATION OF WASHINGTON.

LOGGING-CAR AND BUNK.

1,215,159.  Specification of Letters Patent.  Patented Feb. 6, 1917.

Application filed November 27, 1916. Serial No. 133,604.

*To all whom it may concern:*

Be it known that I, HERBERT C. JARVIS, a citizen of the United States, and resident of the town of Renton, county of King, and State of Washington, have invented certain new and useful Improvements in Logging-Cars and Bunks, of which the following is a specification.

My invention relates to logging cars and more particularly to the construction whereby the bunks are supported.

The object of my invention is to provide an efficient and simple means whereby a flat car of standard construction may be remodeled to make from it what is known in the trade as a connected truck; that is, a car which has only a skeleton longitudinal frame.

My invention comprises the novel features which will be herein described and then particularly pointed out in the claims. In the accompanying drawings I have shown my invention embodied in the form of construction which is now most preferred by me.

Figure 1 is a transverse section of a car taken through the truck just forward of the bolster and the bunk.

Fig. 2 is a side view of one truck of such a car.

Fig. 3 is a detail side view of one end of the top bolster and the bunk, together with the means by which these are connected.

Figs. 4 and 5 are respectively bottom plan and end elevation of the member employed as a filler block, or bracket, between the bolster and the bunk.

The type of car referred to in the trade as a connected truck is a type which consists of two four-wheeled trucks, which are each supplied with a log carrying bunk, the two trucks being fixedly connected together by means of longitudinal frame timbers which are all grouped along a narrow section extending along the center line of the car. Such a car has been found to possess many practical advantages over an ordinary flat car. For one thing, it has no floor to be damaged by the logs or to hold trash and dirt.

It has been common to use ordinary flat cars for loading purposes, either by using temporary wooden stakes, placed in the stake pockets in the side of the car, or by mounting thereon steel frame bunks, which are provided with stakes or chocks for holding the logs in place. It has been found desirable to be able to take these flat cars and remodel them into connected trucks. A simple and practical way of doing this is the object of my present invention.

The type of truck herein shown is one which possesses a bottom bolster or supporting beam 1, having its ends 11, supported upon the truck frame. The truck frame herein shown comprises a transversely extending beam 16 and longitudinal extending trusses 15, in the latter of which the axles are journaled. The under bolster 1 is shown as supported at its ends by springs 17.

Mounted upon the under bolster 1 is the top bolster 2, the two bolsters being connected by a king pin at the point 21, which is the center of their length. These bolsters have side bearings 10 and 20, respectively, which engage and prevent undue tipping of the top bolster in either side direction. The top bolster extends outward beyond these side bearings and, in the usual type of construction, has a pocket or recess formed in its outer ends in which are placed two side beams of the car frame. This pocket has an outwardly end facing surface 22, which in the usual construction lies in a vertical plane, and a ledge 23 projecting outwardly at the lower end thereof, thus forming a recess for the reception of the side timbers of the car.

In remodeling a flat car to make a connected truck of it, I remove the entire floor and the longitudinal beams and replace them by beams 4, which are grouped in contact, or in substantial contact, along the center line of the car. These beams 4 rest upon the top surface of the central portion of the top bolster. It is a customary practice to make the outer side beams of a car of greater depth than those inwardly therefrom. The beams, which are located toward the center of the car, rest upon the same top surface of the bolster as that which sustains the beams 4, but they are spaced a considerable distance apart. The top surface of the beams 4 are at a considerable distance above the surface 24, which forms the top of the bolster near its ends.

In placing a bunk, as 5, upon the timbers 4, this would be elevated some distance above the outer ends of the bolster. To properly support this, I employ filler blocks, or brackets 3, which connect the two and add the strength of the bolster to that of the bunk. This filler block, when used with the type of bolster just described, is made of an L-shape, as is clearly shown in Fig. 3. This filler block 3 is thus provided with two arms, one arm 30, being proportioned to fit in the recess which had been provided at the outer ends of the bolster for receiving the side beams of the car, and the arm 31, extending inwardly therefrom and resting upon the top surface 24 of the bolster. The depth of the arm 31 is such as will bring its upper surface on the level with the top surface of the wooden beams 4.

Means are provided for firmly securing this filler block both to the bolster and to the superposed bunk 5. Such means may consist of bolts 33, which pass through the web at the lower end of the arm 30 of the block and through the projecting ledge 23 of the bolster, and other bolts, as 34, which pass through the side web 50 of the bunk and webs 32 which project from the block. Other bolts or equivalent securing means may be provided as may be desired or dictated by the circumstances.

A filler block of this kind, inserted between the end of the bolster and the bunk, gives a firm support for the outer end of the bunk throughout the material portion thereof. Fitting, as it does, against both a vertical and a horizontal end of the bolster, it transmits the downward strain direct to the bolster without depending upon the strength of the bolts by which these parts are secured together. By this expedient, the bunk and the bolster are bound together so as to form, in effect, a big trussed beam having great strength. The bolster having a side bearing 20, which corresponds with the side bearing 10 of the lower bolster, is well supported against excessive rocking movement. The beams 4 well support the central portion of the bunk and form the connecting frame between the two trucks. In this manner a flat car may be cheaply remodeled into a connected truck.

What I claim as my invention is:

1. In a logging car, in combination, a bolster extending substantially the width of the car and having each end provided with a beam receiving seat, and a filler block of L shape secured with one arm within said seat and the other arm upon the top surface of the bolster inward from said seat.

2. In a logging car, in combination, a bolster extending substantially the width of the car and having each end provided with a beam receiving seat, and a filler block of L shape secured with one arm within said seat and the other arm upon the top surface of the bolster inward from said seat, and a bunk secured on top of the said filler blocks.

3. In a logging car, in combination, a bolster having beam receiving and supporting surfaces in the central portion thereof and a depressed beam-receiving pocket at each end, a filler block entering each of said pockets and overlapping upon the bolster inward from and adjacent said pockets, longitudinal car beams carried upon the central part of said bolster, and a bunk bearing upon said beams and filler blocks.

4. In a logging car, in combination, a bolster extending substantially the width of the car, an L-shaped block fitting over each end of the bolster and secured thereto, and a bunk secured to the top of said block.

5. In a logging car, in combination, a bolster extending substantially the width of the car, an L-shaped block fitting over each end of the bolster and secured thereto, and a bunk secured to the top of said block, and longitudinal frame beams secured between the bolster and bunk at the central part thereof.

6. In a logging car, in combination, a truck bolster, a car bolster, said bolsters centrally pivoting upon each other and having side bearing surfaces toward their outer ends, the top or car bolster extending beyond said side bearing surfaces, a filler block secured upon each end of the car bolster and having a supporting and a thrust bearing upon said car bolster resisting movement toward the center of the bolster, and a log bunk mounted upon said filler blocks.

Signed at Seattle, Washington, this 20th day of November, 1916.

HERBERT C. JARVIS.